US 7,991,664 B1
Aug. 2, 2011

(12) United States Patent
Stone

(54) METHOD AND SYSTEM FOR MAPPING BUSINESS TRANSACTIONS

(75) Inventor: Evan Kenneth Stone, Santa Rosa, CA (US)

(73) Assignee: Intuit Inc., Mountain View, CA (US)

( * ) Notice: Subject to any disclaimer, the term of this patent is extended or adjusted under 35 U.S.C. 154(b) by 408 days.

(21) Appl. No.: 12/016,025

(22) Filed: Jan. 17, 2008

(51) Int. Cl.
*G06Q 40/00* (2006.01)

(52) U.S. Cl. ............... 705/35; 705/6; 705/31; 705/19; 707/999.107; 707/E17.032

(58) Field of Classification Search ............ 340/539.1, 340/286.02, 825.22; 705/6, 35, 19, 31; 1/1; 707/999.107, E17.032
See application file for complete search history.

(56) References Cited

U.S. PATENT DOCUMENTS

| | | | | |
|---|---|---|---|---|
| 2001/0028304 A1* | 10/2001 | I'Anson et al. | ............... | 340/539 |
| 2003/0093320 A1* | 5/2003 | Sullivan | ................... | 705/19 |
| 2003/0236688 A1* | 12/2003 | Kadaba et al. | .................... | 705/6 |
| 2007/0150387 A1* | 6/2007 | Seubert et al. | ................. | 705/31 |
| 2008/0065694 A1* | 3/2008 | Qian | ........................ | 707/104.1 |

OTHER PUBLICATIONS

Consuming passions, Robert Barr, May 2004, GEO: connexion, v3n5, p. 31 (1).*
Eloy Ontiveros, Oracle(R) offers customers bundled NAVTEQ(R) map data for business applications, Monday, Oct. 23, 2006, T14:00:00Z.*
Google, Google Merges Local and Maps Products, Mountain View, California, Oct. 6, 2005, www.google.com/press/pressrel/local_merge.html.

* cited by examiner

*Primary Examiner* — Behrang Badii
(74) *Attorney, Agent, or Firm* — Osha • Liang LLP

(57) ABSTRACT

A method for mapping a business transaction involves obtaining a transaction record of the business transaction, where the transaction record includes business information associated with performing the business transaction, analyzing the transaction record to determine available business information, submitting available business information to a mapping service to obtain a map of a business location, and displaying the map.

14 Claims, 4 Drawing Sheets

METHOD AND SYSTEM FOR MAPPING BUSINESS TRANSACTIONS

BACKGROUND

A business transaction involves an exchange of money, goods, and/or services between two or more parties. One common type of business transaction is when a buyer purchases an item or service from a seller, and pays for the item or service using a check, a credit card, or cash. Some types of purchases involve multiple buyers and/or multiple sellers. Another common type of business transaction is when an individual withdraws money from an automated teller machine (ATM). If the ATM is not directly affiliated with the individual's bank, the individual may also be required to pay a service and/or bank charge. Many different types of business transactions occur with these types of associated service charges.

In many cases, a business transaction may be performed using a payment type linked to a banking account, a credit account, a brokerage account, or another type of financial account managed by a financial institution. For example, checks and debit cards are typically linked to banking accounts, and credit cards are typically linked to credit lines. Many different payment types are linked to financial accounts. When such business transactions occur, the financial institution managing the account stores information about the business transaction and uses the information to manage the account's balance. For example, when an item is purchased, the information may indicate the amount of money exchanged, the buyer's identity, and the seller's identity. In this example, the buyer's financial institution may store information indicating that money left the buyer's account, and the seller's financial institution may store information indicating that money has entered the seller's account.

As a service to customers, many financial institutions make information about business transactions available in electronic form. For example, a banking customer may be able to login to a website and view information about business transactions performed by the banking customer. Further, some financial management software applications now include the ability to transfer information about business transactions from financial institutions into the financial management software application. Information about business transactions may be viewed in many different forms. However, information provided by financial institutions is often limited in scope and may be confusing. For example, the information may include an abbreviated form of a seller's street address without including the seller's business name. When information about a business transaction lacks sufficient detail, the information is less valuable (e.g., someone may have difficulty identifying the business transaction to which the information refers, tracking business transactions, evaluating tax consequences, and/or categorizing the business transaction).

SUMMARY

In general, in one aspect, the invention relates to a method for mapping a business transaction. The method comprises obtaining a transaction record of the business transaction, wherein the transaction record comprises business information associated with performing the business transaction, analyzing the transaction record to determine available business information, submitting available business information to a mapping service to obtain a map of a business location, and displaying the map.

In general, in one aspect, the invention relates to a system for mapping business transactions. The system comprises a mapping service, a banking system comprising transaction records of a plurality of business transactions, and a transaction manager. The transaction manager is configured to obtain a transaction record of a business transaction selected from the plurality of business transactions, wherein the transaction record comprises business information associated with performing the business transaction, analyze the transaction record to determine available business information, submit available business information to the mapping service to obtain a map of a business location, and transmit the map to a user interface.

In general, in one aspect, the invention relates to a computer readable medium comprising a plurality of executable instructions for mapping a business transaction. The plurality of executable instructions comprises instructions to obtain a transaction record of the business transaction, wherein the transaction record comprises business information associated with performing the business transaction, analyze the transaction record to determine available business information, submit available business information to a mapping service to obtain a map of a business location, and display the map.

Other aspects of the invention will be apparent from the following description and the appended claims.

DETAILED DESCRIPTION

Figure 1:
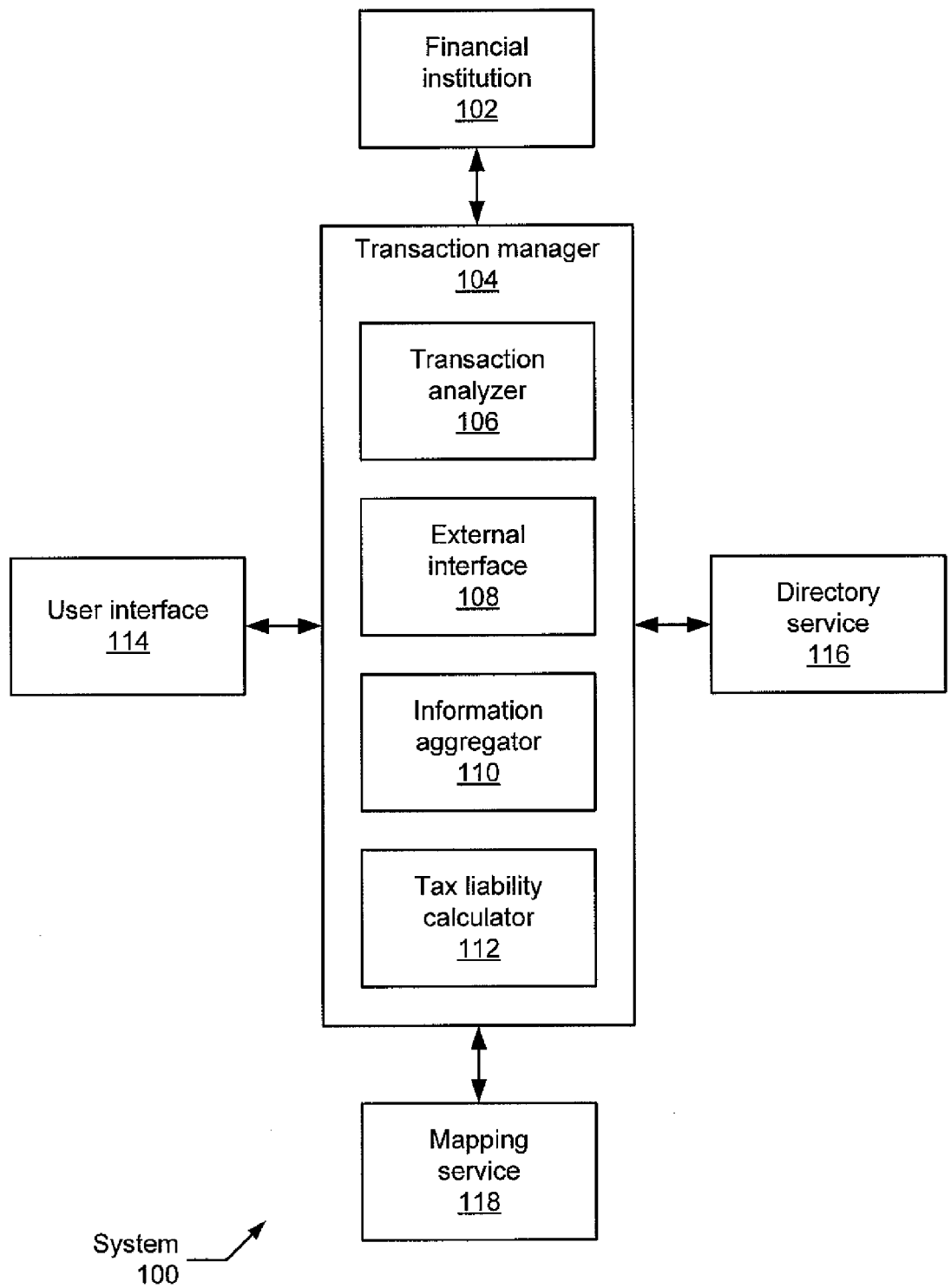
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for mapping business transactions. A transaction record including business information associated with a business transaction is obtained. The transaction record is analyzed to determine available business information included in the transaction record. Available business information is submitted to a mapping service to obtain a map of a business location (i.e., the location of a business involved in the business transaction) and/or evaluate tax liabilities based on the location and/or type of business.

FIG. 1 shows a diagram of a system (100) in accordance with one or more embodiments of the invention. The system (100) includes a financial institution (102) storing information about business transactions, and a transaction manager (104) configured to map business transactions based on information provided by the financial institution (102). Specifically, the financial institution (102) may be storing information about business transactions in one or more databases, and the financial institution (102) may transmit the information to the transaction manager (104) via a network connection, using a predetermined network protocol (typically secured). The financial institution (102) may be a bank, a credit card company, an investment brokerage, or any other type of entity involved in the management of financial value in the form of cash, credit, stocks, etc. Generally speaking, the financial institution (102) may be any type of entity capable of providing information about business transactions.

Although shown separately in FIG. 1 for explanatory purposes, in one or more embodiments, the transaction manager (104) is operated by the financial institution (102). For example, the transaction manager (104) may be located in a local area network (LAN) managed by the financial institution (102). Alternatively, the transaction manager (104) may be operated by a different entity than the financial institution (102), such as a third-party financial services provider. In one or more embodiments, the transaction manager (104) is a module in financial management software, such as financial planning software or tax preparation software. Further, the transaction manager (104) may be hosted in the same computer system(s) that the financial institution (102) uses to provide information about business transactions. For example, the transaction manager (104) may be hosted in a database server that includes one or more database tables storing information about business transactions. Many different arrangements of the financial institution (102) and the transaction manager (104) may be envisioned that remain within the scope of the invention.

In one or more embodiments, the transaction manager (104) includes a transaction analyzer (106). The transaction analyzer (106) is configured to obtain a transaction record from the financial institution (102). The financial record may include business information associated with a business transaction. The transaction analyzer (106) is configured to analyze the transaction record to determine what business information is available in the transaction record. Available business information may include, for example, a transaction amount, a business address, a business name, a transaction date, etc. Many different types of business information may be available and/or accessible based on the transaction record.

In one or more embodiments, the analysis performed by the transaction analyzer (106) involves pattern recognition based on known keywords (for example, "amount" or "payee"). Alternatively, the analysis may be based on a known transaction record format used by the financial institution (102). For example, the transaction record may be stored in an extensible markup language (XML) document, where the structure of the XML tags in the document is already known by the transaction analyzer (106). Alternatively, the transaction record may be stored in plain text, a spreadsheet entry, an email, a database record, hypertext markup language (HTML), or any other format (proprietary or otherwise) that may be used to transmit information about business transactions. Many different transaction record formats may be envisioned that remain within the scope of the invention.

In one or more embodiments, the transaction manager (104) includes one or more external interfaces (108) configured to communicate with components external to the transaction manager (104). For example, the external interface (108) may be configured to transmit available business information (obtained from the transaction record) to a directory service (116). In one or more embodiments, the directory service (116) is configured to provide additional business information based on the available business information. For example, the directory service (116) may be configured to perform a reverse directory lookup, to obtain additional business information based on a business address and/or phone number. Specifically, in one or more embodiments, the directory service (116) is configured to use available business information to identify a name (or any other attribute available via a directory) of a business associated with the business transaction. Alternatively, if the available business information includes a business name but no business address, the directory service (116) may be configured to use the business name to determine the business address.

Further, the external interface (108) may be configured to transmit available business information to a mapping service (118) to obtain a map of a business location. Specifically, the map is of the location of a business referenced in the transaction record. In one or more embodiments, the location is where the business transaction occurred. In one or embodiments, the external interface (108) only transmits the portions of the available business information that are needed by the mapping service (118). Alternatively, the external interface (108) may be configured to indiscriminately transmit all available business information to the mapping service (118). Business information transmitted to the mapping service (118) may also include additional business information obtained from the directory service (116), if available.

In one or more embodiments, the transaction manager (104) includes an information aggregator (110). The information aggregator (110) is configured to aggregate information from the financial institution (102), the directory service (116), and/or the mapping service (118) for displaying at least a portion of the aggregate information in a user interface (114). For example, the information aggregator (110) may include a web service configured to generate a web page with information from one or more of the aforementioned sources.

In one or more embodiments, the user interface (114) is configured to display the map of the business location to a user. For example, the user interface (114) may be a website, such as a financial institution's (i.e., the financial institution (100) or another financial institution) website. As another example, the user interface (114) may be a graphical user interface for financial management software, such as financial planning software or tax preparation software. In one or more embodiments, the user interface (114) is configured to display the business transaction along with a hyperlink to the map of the business location. When the hyperlink is selected, the map is shown, for example in a pop-up window in a web browser. Similarly, the user interface (114) may include a button adjacent to the displayed business transaction. The button may be selected (e.g., by pressing the button or performing a "mouse over" operation by placing a mouse device attached to a computer over the button) to display a map associated with the business transaction.

In one or more embodiments, the system (100) includes a tax liability calculator (112). The tax liability calculator (112) is configured to determine a tax liability for the business transaction, based on the business location. For example, if the business transaction occurred in a particular country or state, the tax liability for the business transaction may be based on tax regulations associated with that country, state, or municipality. Those skilled in the art will appreciate that tax liability for a business transaction may depend on many different factors, and business location may not be a relevant factor for all types of business transactions. In one or more embodiments of the invention, tax liability information associated with the business transaction is also transmitted to the user interface (114).

Figure 2:
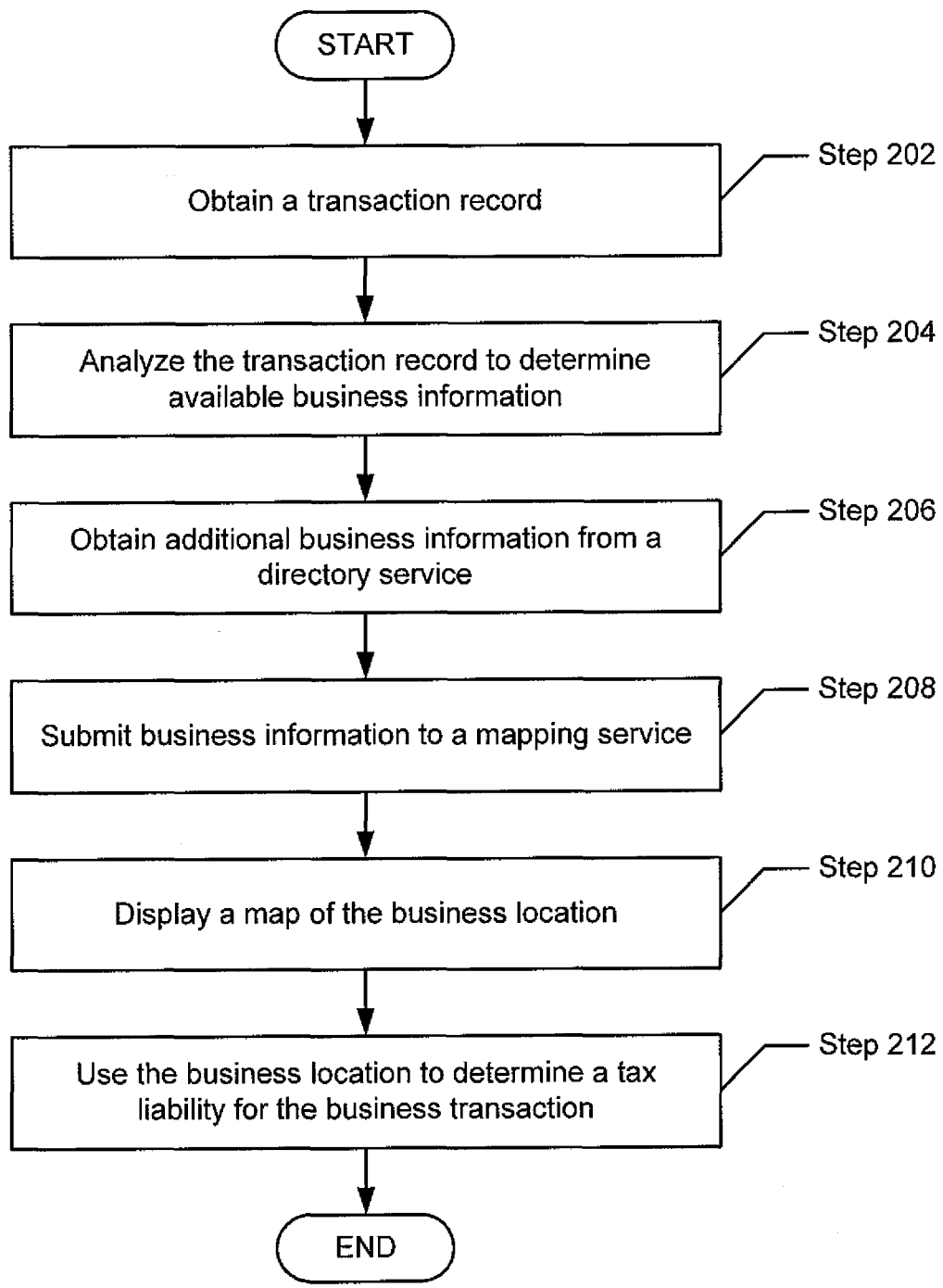
FIG. 2 shows a flowchart of a method for mapping business transactions in accordance with one or more embodiments of the invention.

FIG. 2 shows a flowchart of a method for mapping business transactions in accordance with one or more embodiments of the invention. In one or more embodiments of the invention, one or more of the steps shown in FIG. 2 may be omitted, repeated, and/or performed in a different order than the order shown in FIG. 2. Accordingly, embodiments of the invention should not be considered limited to the specific arrangement of steps shown in FIG. 2.

In one or more embodiments of the invention, in Step 202, a transaction record is obtained. The transaction record includes information about a business transaction, such as a payment amount, a buyer, a seller, etc. For example, the transaction record may indicate an amount the buyer paid, a name and/or address of the seller, a date and/or time of the business transaction, a type of business transaction (e.g., ATM withdrawal, point-of-sale purchase, etc.), any other type of information typically associated with the business transaction, or any combination thereof. As discussed above, the information may be obtained from a financial institution.

In one or more embodiments of the invention, in Step 204, the transaction record is analyzed to determine available business information. That is, the transaction record is analyzed to determine what information the transaction record includes about a business associated with the business transaction. In one or more embodiments, the business is the entity that controls an establishment where the business transaction occurred. Analyzing the transaction record may involve pattern recognition based on known keywords (for example, "amount" or "payee"). Alternatively, the analysis may be based on a known transaction record format used by a financial institution providing the business information. For example, the transaction record may be stored in an extensible markup language (XML) document, using a predetermined XML tag structure. As discussed above, many different transaction record formats may be envisioned that remain within the scope of the invention.

In one or more embodiments of the invention, Step 206, additional business information is obtained. Specifically, additional business information may be obtained by submitting available business information (i.e., business information already available in the transaction record) to a directory service. Based on the available business information, the directory service provides additional information about the business. In one or more embodiments of the invention, the directory service performs a reverse directory lookup to obtain a business name from available address and/or phone information associated with the business. Alternatively, if the available business information includes a business name but no business address, the business name may be determined based on the business address.

In one or more embodiments of the invention, in Step 208, available business information (which may include additional business information obtained from a directory service) is submitted to a mapping service. The mapping service uses the submitted business information to generate a map of a business location. Specifically, in one or more embodiments of the invention, the business location is the location where the business transaction occurred. The mapping service may provide many different types of maps. In one or more embodiments of the invention, using a directory service to obtain additional business information in Step 206 helps ensure that the mapping service is able to provide an accurate map of the business location.

In one or more embodiments of the invention, in Step 210, the map is displayed via a user interface. The user interface may be a web page, a graphical user interface for a stand-alone software application, or any other type of user interface. For example, the user interface may be a web page provided by a financial institution. As another example, the user interface may be part of financial management software such as financial planning software or tax preparation software.

In one or more embodiments of the invention, in Step 212, the business location is used to determine a tax liability for the business transaction. For example, if the business transaction occurred in a particular country, state, county, or municipality, the tax liability for the business transaction may be based on tax regulations associated with that country, state, county, or municipality. Those skilled in the art will appreciate that tax liability for a business transaction may depend on many different factors, and business location is not a relevant factor for all types of business transactions. In one or more embodiments of the invention, the tax liability is also displayed in the user interface along with the map.

Figure 3A:
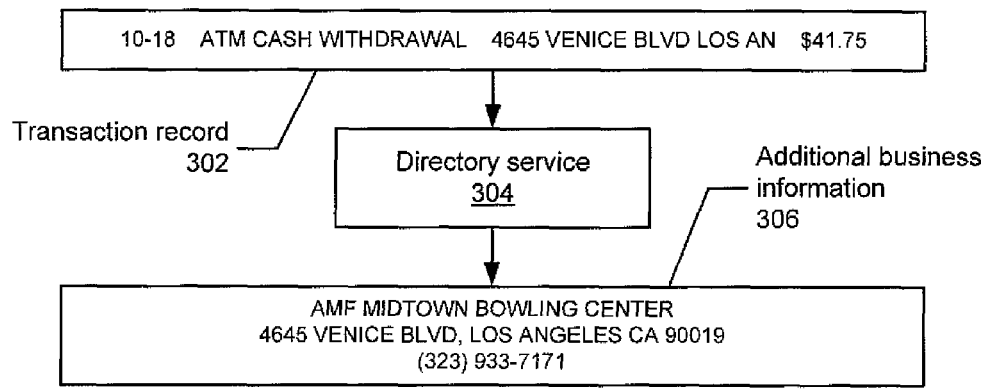
FIGS. 3A-3B show an example of mapping a business transaction in accordance with one or more embodiments of the invention.
Figure 3B:
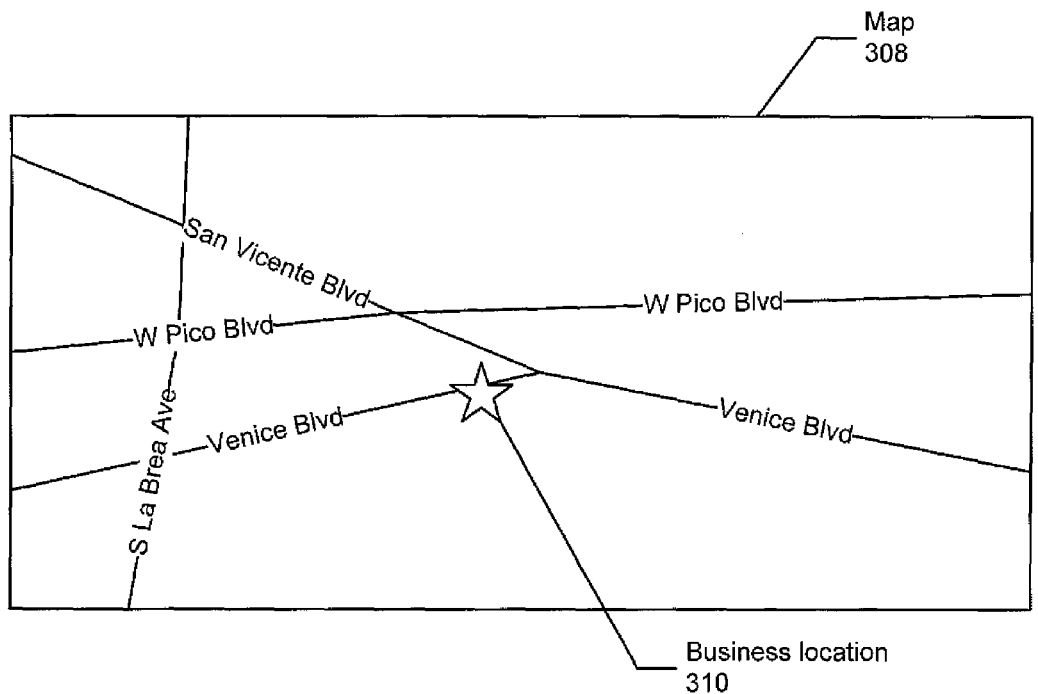

FIGS. 3A-3B show an example of mapping a business transaction in accordance with one or more embodiments of the invention. FIGS. 3A-3B are provided for exemplary purposes only and should not be construed as limiting the scope of the invention.

Referring first to FIG. 3A, a transaction record (302) includes business information associated with a business transaction. The business information indicates that the business transaction was an ATM withdrawal performed on October 18, at 1645 Venice Boulevard (Blvd.), in a city beginning with the characters "Los An . . ." The business transaction was in the amount of $41.75, which is consistent with a $40.00 withdrawal and a $1.75 service charge for a third-party ATM. As discussed above, many different types of information may be included in transaction records. Accordingly, the specific types of information used in this example should not be construed as limiting the scope of the invention.

In one or more embodiments of the invention, by submitting available business information from the transaction record (302) to a directory service (304), additional business information (306) may be obtained. The additional business information (306) includes the full business address, including the full city name ("Los Angeles") and zip code ("90019"). Further, in this example, the directory service (302) was able to determine the name of the business located at the provided address ("AMF Midtown Bowling Center") and the business' telephone number ("(323) 933-7171").

Referring now to FIG. 3B, by submitting business information from the transaction record (302) and/or additional business information (306) to a mapping service, a map (308) of the business location (310) is obtained. The business location (310) refers to the address where the business transaction occurred, and the map (308) provides visual cues for identifying the business location (310), such as major street names, cross-streets, a marker designating the business location (310), etc. Those skilled in the art will appreciate that many different types of maps and different ways to display a map exist. For example, alternative embodiments of the map (308) may have more or less granularity (for example, by including more of the less significant cross-streets), color indicators, scale indicators, etc. Generally speaking, embodiments of the map (308) provide information that helps place the business location (310) in a geographical context. Many different types of maps may be envisioned that remain within the scope of the invention. Accordingly, embodiments of the invention should not be considered limited to the specific type of map shown in FIG. 3B.

Embodiments of the invention allow for business transactions to be mapped, thereby providing additional context for managing the business transactions. For example, a map of a business transaction may help a user to remember details of the business transaction. Conversely, if the business location is not familiar to the user, embodiments of the invention may help detect fraudulent business transactions (for example, if a credit card number is stolen and used in a location where the card's owner has never been). Further, embodiments of the invention may be used to determine tax liability for business transactions, thereby increasing the accuracy of a tax return.

Figure 4:
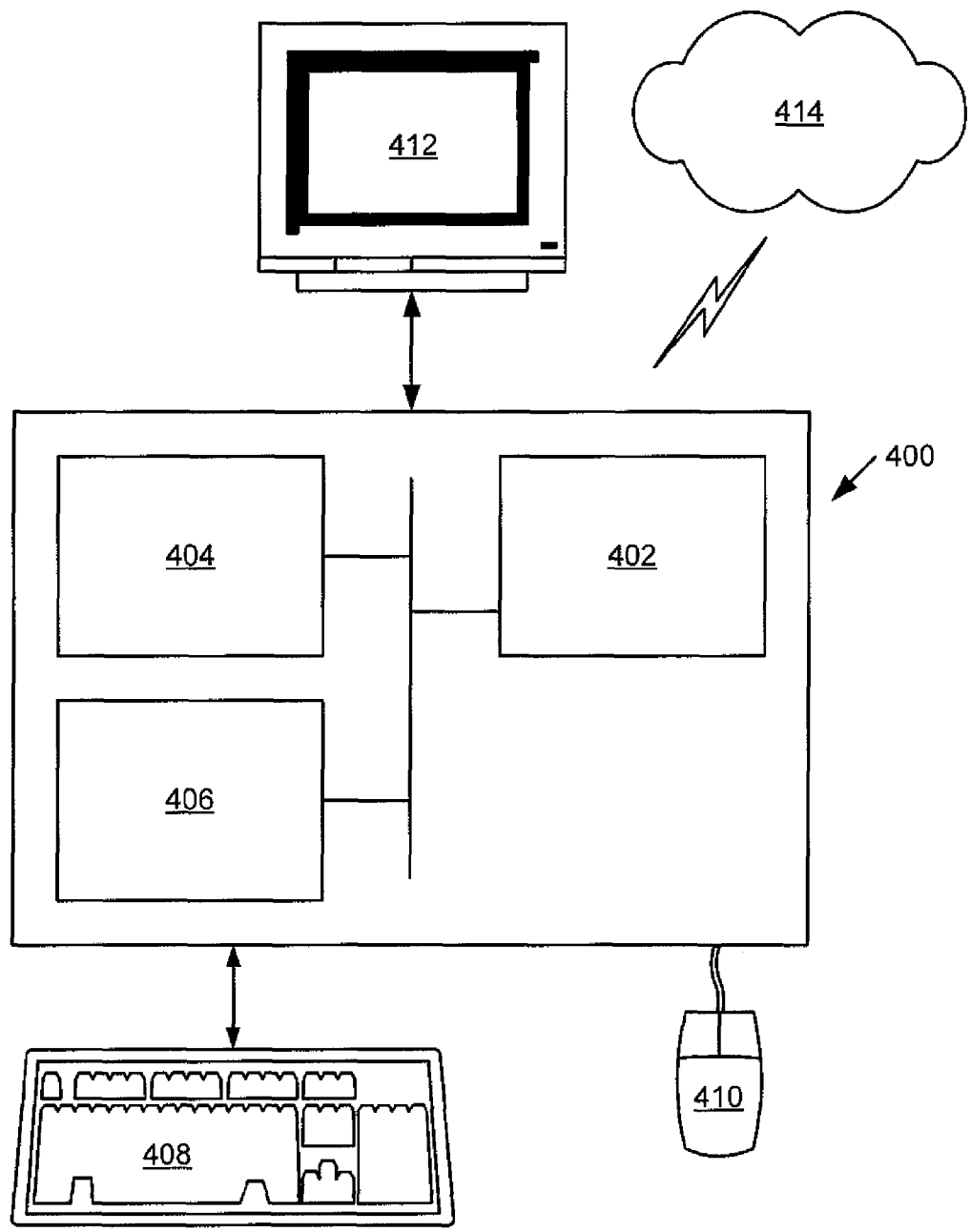
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., financial institution, transaction manager, transaction analyzer, external interface, information aggregator, tax liability calculator, directory service, mapping service, user interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for mapping a business transaction of a plurality of business transactions comprising:
displaying, by a financial management software program (FMSP) executing on a processor, a graphical user interface (GUI) for mapping the business transaction, wherein the business transaction is associated with a financial institution;
obtaining, by the FMSP, a transaction record of the business transaction from the financial institution,
wherein the transaction record comprises business information associated with the business transaction, and
wherein the business transaction is completed;
displaying, by the FMSP, the transaction record to a user, wherein the transaction record is insufficient to allow the user to identify the business transaction to which the transaction record refers;
receiving, at the GUI and in response to displaying the transaction record, user input comprising a request to display a map of a business location at which the business transaction occurred;
determining, by the FMSP, that the business information of the transaction record is incomplete to display the map;
submitting the business information to a directory service to obtain additional business information to complete the transaction record, wherein the directory service comprises a reverse directory lookup, and wherein additional business information comprises a business name;
submitting the business information and the additional business information to a mapping service to obtain the map of the business location;
determining a tax liability for the business transaction based on the business location; and
displaying, using the GUI, the map of the business location.

2. The method of claim 1, further comprising:
generating a hyperlink from a display of the transaction record to the map, wherein displaying the map is performed in response to selecting the hyperlink.

3. The method of claim 1, further comprising:
displaying a button adjacent to the transaction record, wherein displaying the map is performed in response to a mouseover of the button.

4. The method of claim 1, wherein displaying the map comprises displaying a popup window from a banking system website.

5. A system for mapping a business transaction of a plurality of business transactions comprising:
a mapping service;
a directory service;
a banking system comprising a transaction record of the business transaction;
a graphical user interface (GUI) to:
display the transaction record to a user, wherein the transaction record is insufficient to allow the user to identify the business transaction to which the transaction record refers;
receive user input comprising a request to display a map of a business location at which the business transaction occurred; and
display a map of the business location; and
a transaction manager configured to:
obtain the transaction record from the banking system,
wherein the transaction record comprises business information associated with the business transaction, and
wherein the business transaction is completed;
determine that the business information of the transaction record is incomplete to display the map;
submit the business information to the directory service to obtain additional business information to complete the transaction record, wherein the directory service comprises a reverse directory lookup, and wherein additional business information comprises a business name;

submit the business information and the additional business information to the mapping service to obtain the map of the business location;

determine a tax liability for the business transaction based on the business location; and transmit the map to the GUI.

6. The system of claim 5, wherein the GUI comprises a webpage, wherein the webpage comprises a hyperlink from a display of the transaction record to the map, and wherein the transaction manager is configured to transmit the map to the graphical user interface in response to selecting the hyperlink.

7. The system of claim 5, wherein the GUI comprises a webpage, wherein the webpage comprises a button adjacent to the transaction record, wherein the transaction manager is configured to transmit the map to the GUI in response to a mouseover of the button.

8. The system of claim 5, wherein the GUI comprises a popup window from a banking system webpage.

9. The system of claim 5, wherein the transaction manager is a module in a financial management application.

10. The system of claim 9, wherein the financial management application is a tax preparation application.

11. A non-transitory computer readable medium comprising a plurality of executable instructions for mapping a business transaction of a plurality of business transactions, wherein the plurality of executable instructions comprises instructions for:

displaying a graphical user interface (GUI) for mapping the business transaction, wherein the business transactions is associated with a financial institution;

obtaining a transaction record of the business transaction from the financial institution,
wherein the transaction record comprises business information associated with the business transaction, and
wherein the business transaction is completed;

displaying the transaction record to a user, wherein the transaction record is insufficient to allow the user to identify the business transaction to which the transaction record refers;

receiving, at the GUI and in response to displaying the transaction record, user input comprising a request to display a map of a business location at which the business transaction occurred;

determining that the business information of the transaction record is incomplete to display the map;

submitting the business information to a directory service to obtain additional business information to complete the transaction record, wherein the directory service comprises a reverse directory lookup, and wherein additional business information comprises a business name;

submitting the business information and the additional business information to a mapping service to obtain the map of the business location;

determining a tax liability for the business transaction based on the business location; and displaying, using the GUI, the map of the business location.

12. The non-transitory computer readable medium of claim 11, wherein the plurality of executable instructions further comprises instructions for:

generating a hyperlink from a display of the transaction record to the map, wherein instructions to display the map are executed in response to selecting the hyperlink.

13. The non-transitory computer readable medium of claim 11, wherein the plurality of executable instructions further comprises instructions for:

displaying a button adjacent to the transaction record, wherein instructions to display the map are executed in response to a mouseover of the button.

14. The non-transitory computer readable medium of claim 11, wherein instructions to display the map comprise instructions to display a popup window from a banking system website.

* * * * *